United States Patent
Merinova

(10) Patent No.: US 10,086,992 B2
(45) Date of Patent: Oct. 2, 2018

(54) DISPOSABLE STRAINER FOR INFUSING TEA WITH A SQUEEZING SYSTEM

(76) Inventor: Elena Arkadyevna Merinova, Kirov (RU)

(*) Notice: Subject to any disclaimer, the term of this patent is extended or adjusted under 35 U.S.C. 154(b) by 418 days.

(21) Appl. No.: 14/240,253

(22) PCT Filed: Sep. 8, 2011

(86) PCT No.: PCT/RU2011/000689
§ 371 (c)(1),
(2), (4) Date: Feb. 21, 2014

(87) PCT Pub. No.: WO2012/023883
PCT Pub. Date: Feb. 23, 2012

(65) Prior Publication Data
US 2014/0199440 A1 Jul. 17, 2014

(30) Foreign Application Priority Data
Aug. 20, 2010 (RU) .................. 2010134801

(51) Int. Cl.
*B65D 85/812* (2006.01)
*A47G 19/16* (2006.01)
*A47J 31/06* (2006.01)

(52) U.S. Cl.
CPC .......... *B65D 85/812* (2013.01); *A47G 19/16* (2013.01); *A47J 31/0636* (2013.01)

(58) Field of Classification Search
CPC ............. B65D 81/00; B65D 2081/002; B65D 2081/005; B65D 2081/007; B65D 81/3837; B65D 41/04; B65D 85/812; B65D 85/808; B65D 85/8046; B29B 29/02; B29B 29/04; A47G 19/22; A47G 19/2205; A47G 19/2255; A47G 19/16; A47J 31/0636

USPC ...... 426/77, 78, 79, 80, 81, 82, 394; 220/53, 220/692, 694, 696, 740; 99/321, 322, 99/323

See application file for complete search history.

(56) References Cited

U.S. PATENT DOCUMENTS

| | | | |
|---|---|---|---|
| 2,728,670 A | * | 12/1955 | Young .................. B65D 85/812 206/0.5 |
| 2,885,290 A | | 5/1959 | Krasker |
| 3,631,793 A | | 1/1972 | Bednartz |

(Continued)

FOREIGN PATENT DOCUMENTS

| CN | 2555746 Y | 6/2003 |
|---|---|---|
| DE | 3935121 A1 | 4/1990 |

(Continued)

OTHER PUBLICATIONS

Machine Translation of EP 1757213. Thomas Voelkl. Feb. 28, 2007.*

(Continued)

*Primary Examiner* — Michele L Jacobson
*Assistant Examiner* — Ericson M Lachica

(57) ABSTRACT

A disposable strainer for infusing tea has a rigid base with a fold line along which the base of the strainer is folded once infusion is complete, an easily deformable moisture-permeable infusion container, and a squeezing mechanism consisting of threads, the threads being laid over the surface of the moisture-permeable container of the strainer, and the squeezing mechanism allowing by threads drawing to squeeze the infused tea inside the strainer once the strainer is folded.

15 Claims, 1 Drawing Sheet

(56) References Cited

U.S. PATENT DOCUMENTS

| | | | |
|---|---|---|---|
| 4,715,271 A | 12/1987 | Kitagawa | |
| 4,875,574 A * | 10/1989 | Travers | B65D 85/8085 |
| | | | 206/0.5 |
| 5,091,197 A * | 2/1992 | Ferro | B65D 85/812 |
| | | | 206/0.5 |
| 5,366,741 A | 11/1994 | Van Der Zon | |
| 5,605,710 A | 2/1997 | Pridonoff et al. | |
| 5,736,042 A | 4/1998 | Aoki | |
| 5,806,409 A | 9/1998 | Johnson et al. | |
| 5,878,550 A | 3/1999 | Cahill et al. | |
| 5,937,737 A | 8/1999 | Karell | |
| 6,138,551 A | 10/2000 | Bauer et al. | |
| 6,844,015 B2 | 1/2005 | Yuguchi | |
| 7,077,054 B1 | 7/2006 | Hurlock | |
| D619,428 S | 7/2010 | Saha et al. | |
| 7,849,785 B1 | 12/2010 | Saha et al. | |
| 2004/0091580 A1* | 5/2004 | Chernov | B65D 85/812 |
| | | | 426/80 |
| 2006/0226147 A1* | 10/2006 | Phillips | A47G 21/106 |
| | | | 220/254.2 |
| 2008/0017043 A1* | 1/2008 | O'Brien | B65D 85/8085 |
| | | | 99/287 |
| 2008/0213434 A1* | 9/2008 | Burchard | B65D 85/812 |
| | | | 426/82 |
| 2011/0183042 A1 | 7/2011 | Teng | |

FOREIGN PATENT DOCUMENTS

| | | | |
|---|---|---|---|
| EP | 0741988 A1 | 11/1996 | |
| EP | 1757213 A2 * | 2/2007 | ......... A47J 31/0636 |
| GB | 2282059 A | 3/1995 | |
| JP | 2005/206256 A | 8/2005 | |
| NZ | 256118 A | 11/1995 | |
| RU | 2141438 A1 | 11/1999 | |
| RU | 96742 U1 | 8/2010 | |
| RU | 2446085 C1 | 3/2012 | |
| WO | 96/28365 A1 | 9/1996 | |
| WO | WO 9903734 A1 * | 1/1999 | ............ B65B 29/04 |
| WO | 2013/062448 A3 | 5/2013 | |
| WO | 2013/081500 A3 | 6/2013 | |

OTHER PUBLICATIONS

Machine Translation of EP 1757213. Thoma Voelkl. Feb. 28, 2007.*
Translation of Volkl EP 1757213. Feb. 28, 2007.*
"Tea Tool", http://www.teatool.com/, ODM Group, 2009.
"Dreamfarm Teafu Squeeze Tea Infuser", http://steepster.com/teas/teaware/30696-dreamfarm-teafu-squeeze-tea-infuser, Timolino Teaware, 2013.
"Kitchen: Black Silicone tea Infuser", http://www.chickenboyshop.com/servlet/the-186/souvernirs-functional-retro-pop/Detail, Chicken Boy Shop, 2014.
International Search Report for PCT/RU2011/000689, dated Dec. 28, 2011.

* cited by examiner

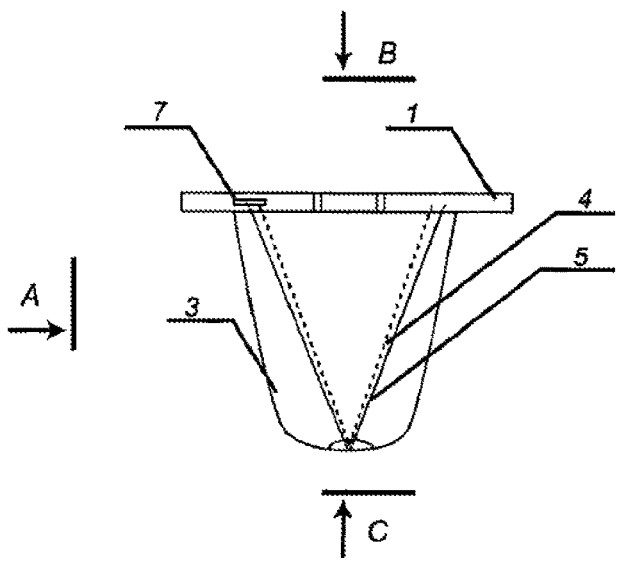
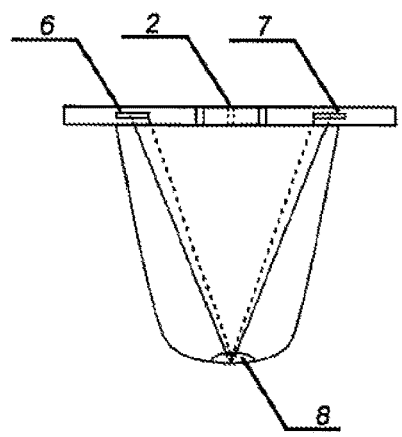
FIG. 1  FIG. 1A
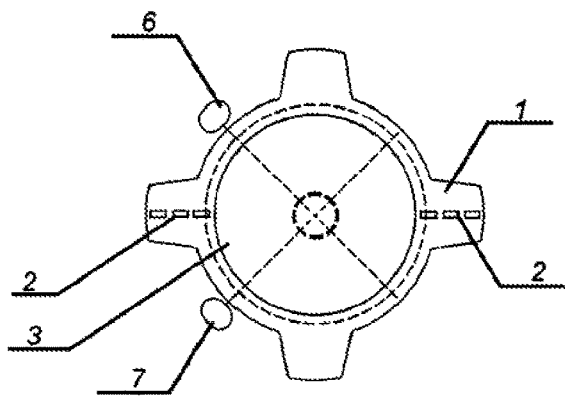
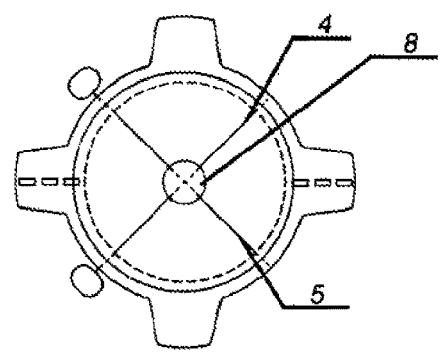
FIG. 1B  FIG. 1C
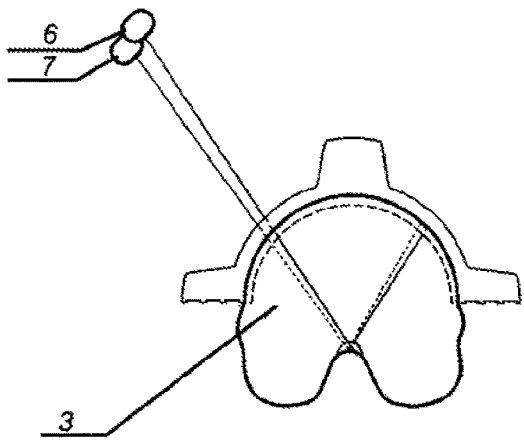
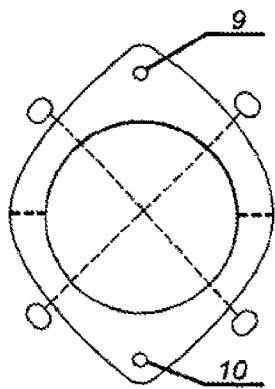
FIG. 2  FIG. 3

DISPOSABLE STRAINER FOR INFUSING TEA WITH A SQUEEZING SYSTEM

DESCRIPTION OF THE INVENTION

The present invention relates to disposable means for infusing tea or other extracts.

From existing state of the art it is known a device for infusion (U.S. Pat. No. 3,631,793 (A), published on Jan. 4, 1972).

A tea strainer (EP1757213 (A2), published on Feb. 28, 2007) is closest with relation to the claimed technical solution. The said strainer is represented in different versions and is realized as an individual means for loose tea infusion, including for a single use. It allows a consumer to make loose tea infusion of preferred quality and quantity. The drawback of the said device is that it must be submerged into a glass or a cup for tea infusion, when used as the individual mean, and must be removed from the vessel with water, in which case the water absorbed by the infused tea will leak from the strainer leaving unwanted stains. An infused tea squeezing option would serve to make the tea infusion process easier and hygienic.

The claimed invention aims at solving the problem of providing a consumer by a disposable device for loose tea infusion ensuring maximum convenience in recycling after use.

The claimed invention provides a solution for the said problem as a disposable strainer for infusing tea comprising a rigid base with a fold line along which the base of the strainer is folded once infusion is complete, an easily deformable moisture-permeable infusion container and a squeezing mechanism of threads laid over the surface of the moisture-permeable container of the strainer, which allows by threads drawing to squeeze the infused tea inside the strainer once it is folded.

The device can have a positioning overlay on the surface of the infusion container of the strainer, which allows to fix the threads in a specific position on the surface of the infusion container of the strainer without limiting the freedom of movement of the threads.

The device can have the squeezing mechanism with a various number of threads.

The device can have the squeezing mechanism with a varying pattern of distribution of threads.

The device can have the squeezing mechanism consisting of threads, one end of each thread being fixed and immovable and the other being movable and drawn during squeezing.

The device can have the squeezing mechanism consisting of threads, both ends of each thread being equally movable.

The device can have holders at the movable ends of the threads of the squeezing mechanism.

The device can have the squeezing mechanism attached to the rigid base of the strainer, which immovable ends of the threads are fixed in a body of the rigid base, and movable ends are passed through grooves in the body of the rigid base of the strainer.

The device can have the squeezing mechanism attached to the infusion container of the strainer by one or more positioning overlays.

The device can have the positioning overlay which size is equal to the surface size of an infusion part of the strainer.

The device can be manufactured: the rigid base from a solid and easy flexible material, for example, from plastic, from cardboard or the like; and the infusion container from an easily compressible and moisture-permeable material, for example, from cellulose, from filter paper and the like.

The device can have a clamp on the rigid base of the strainer allowing to fix the rigid base of the strainer in the folded position.

The device can have the rigid base where the fold line is marked by perforation, by groove, by trough, by combination of these features or by another corresponding method.

The technical result ensured by the said battery of features is the opportunity for a consumer to obtain easily an individual portion of tea infusion from loose tea and after that to recycle the infused tea with the device in an effortless way.

The essence of the invention is illustrated with the help of drawings, wherein:

FIG. 1 shows front view of the device;
FIG. 1A shows side view of the device;
FIG. 1B shows plane view of the device;
FIG. 1C shows underside view of the device;
FIG. 2 shows side view of the device during tea squeezing;
FIG. 3 shows plane view of a version of the device with several modifications.

The device consists of: a rigid base 1 which is placed on the edge of a vessel with water; a fold line 2 crossing the base 1; a moisture-permeable infusion container 3 and a squeezing mechanism consisting of threads 4 and 5 and holders 6 and 7 at the ends of the threads (FIG. 1, 1A).

The squeezing mechanism consists of two threads 4 and 5 passing through the center of the infusion container 3 along its external surface from edge to edge and intersecting each other at the right angle to ensure as much as possible complete and uniform squeezing of tea infusion. One end of each thread is fixed in a body of the rigid base of the strainer 1, while the other end placed on the opposite side of the rigid base 1 passes through a groove in the body of the base 1 and ends in a holder (FIG. 1B).

A various number of threads can also be utilized in the squeezing mechanism, and they can be arranged along the surface of the infusion container in a different manner. A version wherein the ends of the threads remain movable on both ends, pass through the grooves in the body of the base and end in holders, instead of being fixed in the body of the base, is also possible (FIG. 3).

The device can have a positioning overlay 8 (FIG. 1A, 1C) to maintain predetermined positions of the threads and ensure uniform squeezing. Threads 4 and 5 pass on top of the external side of the infusion container 3 and have a free course, while the positioning overlay 8 is attached to the external surface of the infusion container 3 on top of the threads 4 and 5. In this manner, channels are formed between the infusion container 3 and the positioning overlay 8 to allow threads 4 and 5 to move freely during squeezing and keep them from shifting apart. The positioning overlay may be round, cruciform or have another shape and size.

The device can have several positioning overlays. A version wherein the threads of the squeezing mechanism are attached only to the infusion container by positioning overlays, instead of being attached to the rigid base of the strainer, is also possible.

In addition, the base of the device can have a clamp (FIG. 3) which allows to fix the strainer in the folded position. FIG. 3 shows the version of the clamp, wherein the clamp consists of a projecting part 9 located on one half of the base of the strainer, and an opening 10 of corresponding size on the other half. After folding the base of the strainer the projecting part 9 enters the opening 10 and is fixed there by friction.

FIG. 3 shows a version of the device with the clamp, without the positioning overlay and with a modification of a design of the base.

The claimed device can be produced in different volume and design. The rigid base may be round, square or of another figured shape and have horizontal projections (coinciding with the plane of the rigid base) to better hold onto the edges of the vessel with water, for a more convenient grip on the strainer during folding, as well as to make wide and strong enough the areas adjacent to the fold line, for example, with a perforation. The infusion container can be produced in different volume for ensuring the infusion of a required quantity of tea and in different depths to facilitate tea infusion in various dishes.

The fold line in the rigid base may be manufactured as a groove, as a perforation line or have troughs or other corresponding features.

The device works as follows. Tea is put into the infusion container of the strainer 3, after that the rigid base of the strainer 1 is placed onto the edge of the vessel with water, and the infusion container 3 is submerged in water. Once infusion is complete, the rigid base of the strainer 1 is lifted and folded in two along the fold line 2 to retain the infused tea inside the strainer.

Then the consumer grips the folded strainer in one hand and pulls by the other at the holders 6 and 7 of the threads of the squeezing mechanism 4 and 5 to compress the infusion container 3 (FIG. 2) with infused tea and to squeeze the excess water into the vessel with tea infusion. If the base comes with the clamp, the strainer is locked, in other case it can be fixed in the folded position by wrapping the drawn threads around the same. The strainer is then disposed of.

A production of the claimed disposable strainer will allow a consumer to expand a scope of use of loose tea and to abandon mass manufactured tea bags, which are generally known to contain low-quality granulated tea despite being very convenient to use. A disposable strainer will make brewing of better quality tea just as easy and convenient.

Furthermore, the said strainer is good marketing tool for loose tea manufacturers because the production of such strainer will contribute to a boost in loose tea sales, whereas low production costs of the said strainer will make it possible to bundle it with a pack of tea as an added-value bonus for the consumer.

Besides, the rigid base of the strainer may be used as an advertising vehicle.

Also, the benefits of the claimed device are minimum effort required to manufacture the said device, low costs, portability and an option to use eco-friendly materials for its production.

The invention claimed is:

1. A disposable strainer for infusing loose tea, which comprises an open top infusion container made of a deformable moisture-permeable material, a flat rigid base to be placed at an edge of a vessel, and a squeezing mechanism, the rigid base having a through opening into the infusion container for filling an infusable material, an edge of an opening of the infusion container being fixed to the bottom side of the base around the perimeter of the through opening of the base to form a cup-shaped structure, the rigid base further having a fold line which crosses the center of the through opening of the base and is marked by perforation, groove, trough or their combination, so as to permit folding the base in half in a direction away from the infusion container, and the squeezing mechanism consisting of at least one thread which is laid over a surface of the infusion container, for squeezing infused tea inside the strainer by drawing the at least one thread once the strainer is folded along said fold line, the at least one thread comprises a first end and a second end, at least the first end of the at least one thread is movably attached to the rigid base.

2. The disposable strainer according to claim 1, which comprises a positioning overlay on the surface of the infusion container of the strainer,
wherein the positioning overlay allows to fix the at least one thread in a specific position on the surface of the infusion container of the strainer without limiting the freedom of movement of the at least one thread.

3. The disposable strainer according to claim 1, wherein the first end is drawn during squeezing, and wherein the second end is fixed and immovable.

4. The disposable strainer according to claim 1, wherein both the first and the second ends are equally movable.

5. The disposable strainer according to claim 3, which comprises a holder at the movable first end of the at least one thread of the squeezing mechanism.

6. The disposable strainer according to claim 1, wherein the rigid base comprises a body with grooves in the body,
wherein the second end of the at least one thread is immovable,
wherein the squeezing mechanism is attached by the second end of the at least one thread to the rigid base of the strainer, the second end of the at least one thread being fixed in the body of the rigid base, and
wherein the first end of the at least one thread is passed through the grooves in the body of the rigid base of the strainer.

7. The disposable strainer according to claim 1, which comprises the squeezing mechanism attached to the infusion container of the strainer by at least one positioning overlay.

8. The disposable strainer according to claim 2, which comprises an infusion part presenting a surface size,
wherein a size of the positioning overlay is equal to the surface size of the infusion part.

9. The disposable strainer according to claim 1, wherein the rigid base is manufactured from a solid and flexible material chosen from plastic and cardboard;
wherein the infusion container is manufactured from a compressible and moisture-permeable material chosen from cellulose and filter paper.

10. The disposable strainer according to claim 1, which comprises a clamp on the rigid base of the strainer,
wherein the clamp allows to fix the rigid base of the strainer in a folded position.

11. The disposable strainer according to claim 4, which comprises holders at both movable first and second ends of the at least one thread of the squeezing mechanism.

12. The disposable strainer according to claim 10, wherein the clamp consists of:
a projecting part located on one half of the rigid base of the strainer, and
an opening of corresponding size on the other half of the rigid base,
wherein the projecting part is adapted to enter the opening and to hold on to the opening by friction once the strainer is folded.

13. The disposable strainer according to claim 1, wherein the rigid base comprises projections coinciding with a plane of the rigid base.

14. The disposable strainer according to claim 1, which is adapted to be fixed in a folded position by wrapping the at least one thread around the strainer.

15. The disposable strainer according to claim 2, wherein channels formed between the infusion container and the positioning overlay are adapted for allowing the at least one thread to move freely during squeezing and to keep the at least one thread from shifting apart.

\* \* \* \* \*